Nov. 1, 1955   E. C. RHYNE, JR., ET AL   2,722,646
ALTERNATING CURRENT MOTOR CONTROL SYSTEMS
Filed Oct. 6, 1951   3 Sheets-Sheet 1
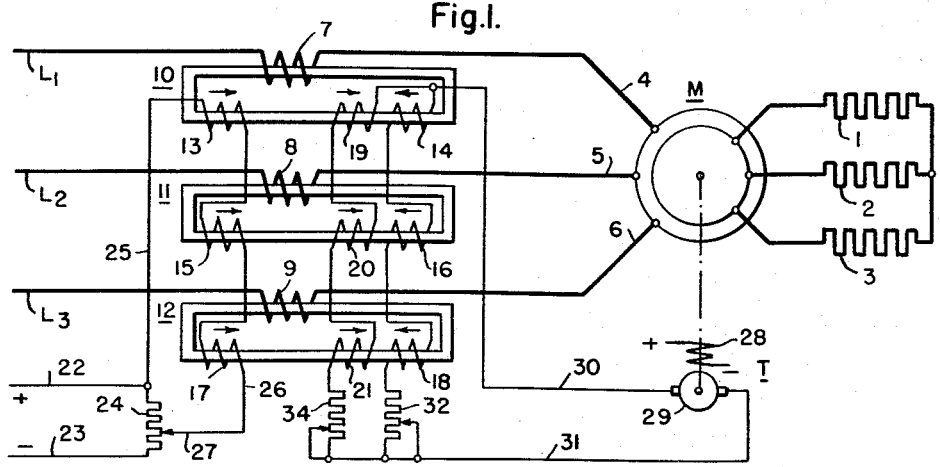
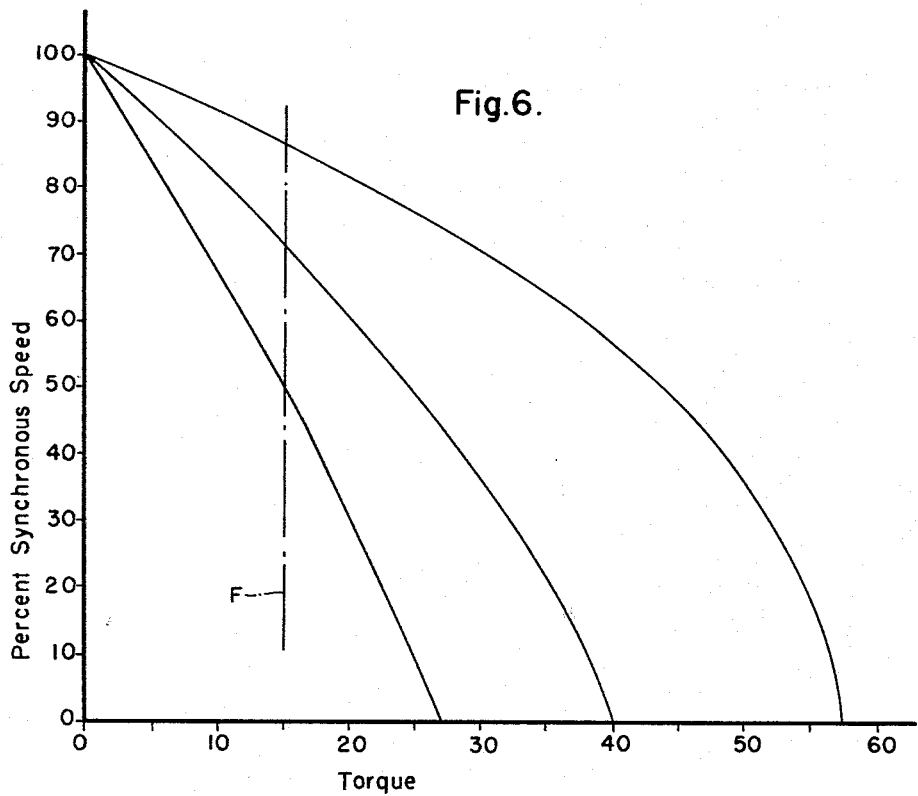
WITNESSES:
E. A. McCloskey.
E. F. Checkeim.
INVENTORS
Earl C. Rhyne, Jr.,
and Herbert R. Behr.
BY
Paul E. Friedemann
ATTORNEY

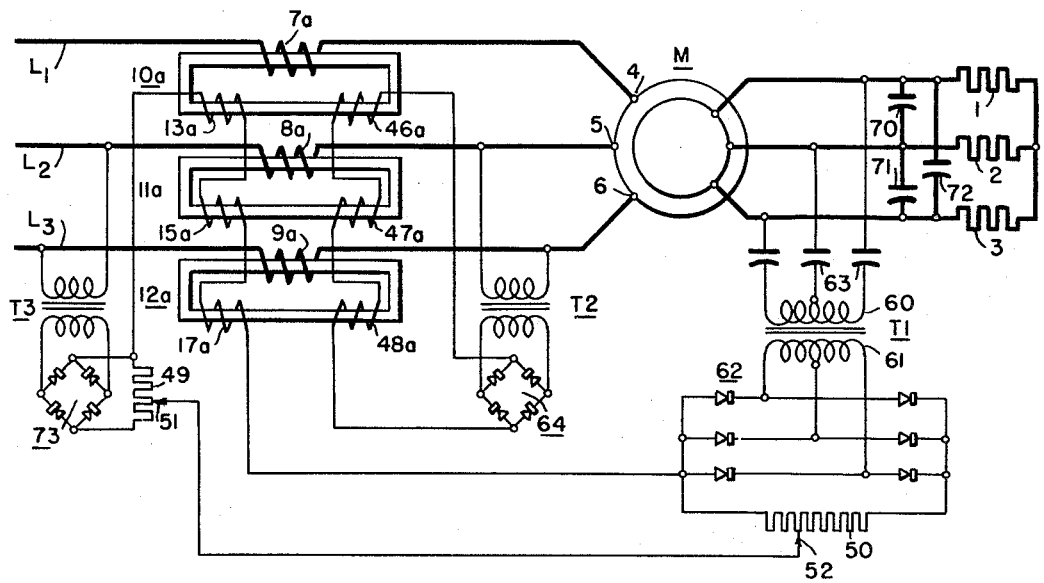
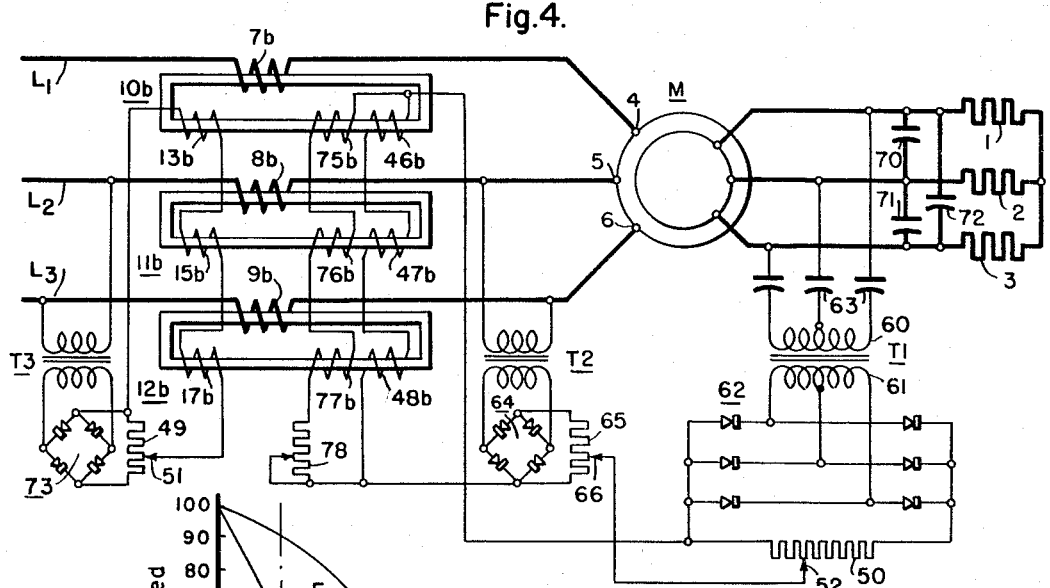
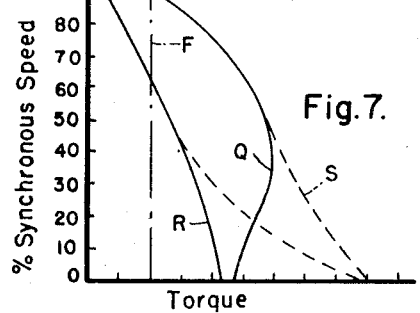

United States Patent Office 2,722,646
Patented Nov. 1, 1955

2,722,646

ALTERNATING CURRENT MOTOR CONTROL SYSTEMS

Earl C. Rhyne, Jr., Cheektowaga, N. Y., and Herbert R. Behr, Chicago, Ill., assignors, by direct and mesne assignments, to Cline Electric Manufacturing Company, Chicago, Ill., a corporation of Illinois Application October 6, 1951, Serial No. 250,111

8 Claims. (Cl. 318—229)

Our invention relates to systems for controlling alternating-current motors, particularly induction motors, by varying either or both the energizing voltage and current of the motor.

Control systems of the type mentioned are known in the trade in which all primary phase voltages of a multiphase induction motor are subjected to a controlled change in amplitude so that the multiphase terminal voltage of the motor remains balanced throughout the available range of voltage change. For such voltage-balanced controls, use is made of impedance devices, as for example variable resistors or saturable reactors connected in each of the supply leads of the motor.

If the effective impedance of such impedance devices is normally constant, the control performance is not suitable for general application because the speed-torque characteristic of the motor is so modified that a relatively high-speed pull-out point exists.

We avoid a high-speed pull-out point by means of a saturable core reactor type of control controlled with the aid of a tachometer generator coupled to be driven by the motor, either by direct coupling to the motor shaft or some suitable indirect coupling, and controlled with other operating functions of the motor and supply.

It is an object of our invention to improve systems of the above-mentioned general type, to secure a stable speed-torque characteristic of the motor within a wide range of speeds with the aid of a tachometer generator, or some like source of speed-measuring voltage.

Another object of our invention is to improve the sensitivity and efficiency of the regulating performance of such control systems so that the controlled series impedance varies more sensitively and over a greater range in response to a change in motor speed, to provide improved accuracy of control with fewer and smaller components as compared with somewhat similar known systems of control.

A still further object of our invention is the provision of a control over a wider speed range.

To achieve these objects we vary the series-impedance device of an induction motor control system in dependence upon two component control voltages of which one is constant but selectively adjustable to any constant value, while the other varies as a function of motor speed.

These hereinabove mentioned features and other features, set forth more particularly in the appended claims, and still other objects and advantages will become more apparent from a study of the following specification if made in conjunction with the drawings, in which:

Figure 1 is a diagrammatic showing of one embodiment of our invention;

Figs. 2, 3 and 4 are diagrammatic showings of modifications of our invention; and Figs. 5, 6 and 7 are coordinate speed-torque curves explanatory of the operation of our motor control.

Figure 2:
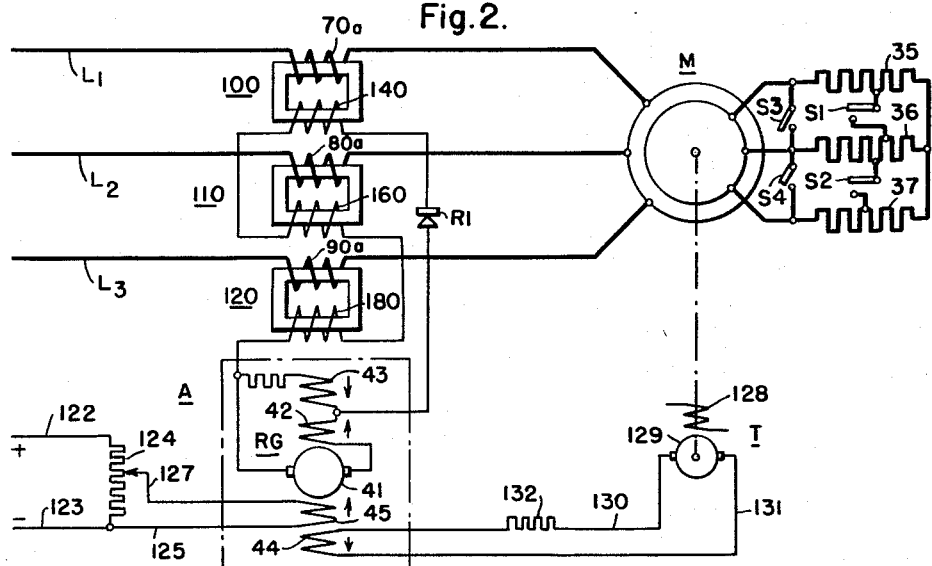

In Figs. 1 and 2, the motor to be controlled is denoted by M, the energizing line terminals are shown at $L_1$, $L_2$ and $L_3$ and T designates the tachometer generator for providing a control voltage to the impedance devices connected in the supply lead of the motor.

The motor to be controlled is preferably a wound-rotor induction motor, but our control is not limited to this type of induction motor but is also usable with a squirrel-cage induction motor. It is important that the resistance of the rotor circuit be relatively high.

According to Figure 1, the secondary circuit has external resistors 1, 2 and 3. These resistors may be resistance-adjustable in the customary manner, somewhat as shown by the switches S1, S2, S3 and S4 provided for the external rotor resistors 35, 36 and 37 connected in the secondary of the motor shown in Fig. 2.

The primary motor terminals 4, 5 and 6 are connected to the supply leads $L_1$, $L_2$ and $L_3$, respectively through the main windings 7, 8 and 9 of the saturable reactors 10, 11 and 12, respectively. The effective reactive impedance of the main windings in each reactor is differentially controlled by two direct current saturation windings 13 and 14, 15 and 16, and 17 and 18. Each core carries further an auxiliary winding 19, 20 and 21, respectively for reducing hunting tendencies.

The windings 13, 15 and 17, which may be referred to as the pattern windings, are excited by suitable constant direct-current voltage designated by the terminals 22 and 23. A suitable potentiometer resistor 24 is connected across the terminals 22 and 23. The windings 13, 15 and 17 are all connected in series with one end terminal 25 connected to the positive terminal 22 and the other end terminal 26 connected, through an adjustable connection or tap 27, to any point on the potentiometer resistor 24. The magnitude of the excitation of the pattern windings 13, 15 and 17 may thus be selectively adjusted from zero to full value, when the tap 27 is adjusted between the positive and negative potentiometer terminals, respectively.

The windings 14, 16 and 18 are excited from the output terminals of the tachometer generator T. The tachometer generator is of the conventional type having a field winding 28 excited at a constant value and an armature winding 29 supplying the leads 30 and 31 with a potential that is a function of the speed of motor M. The design of the tachometer generator is usually such that the potential on leads 30 and 31 is directly proportional to motor speed. While one type of speed responsive device is shown, it is to be appreciated that any device giving an electrical signal proportional to speed may be used. The windings 14, 16 and 18 are all connected in series through the adjustable resistor 32 to the leads 30 and 31, and thus provide the reactors 10, 11 and 12, respectively, with a control voltage that is a function of the motor speed.

The control windings 14, 16 and 18 are poled in opposed relation to the windings 13, 15 and 17, respectively, so that the resultant direct-current magnetization depends upon the difference between the adjusted constant voltage supplied to the windings 13, 15 and 17 and the variable voltage supplied to the windings 14, 16 and 18. Consequently, during the operation of the motor, the degree of saturation in each reactor is varied so as to tend to maintain the motor terminal voltage at a constant value determined by the selected setting of the lead 27 on the potentiometer resistor 24. The control and regulating performance thus achieved will be more clearly understood by reference to the performance diagrams shown in Figs. 5 and 6.

When an attempt is made to control the speed of an induction motor by series impedances in the primary motor circuit with a fixed impedance adjustment, the obtainable stable speed control range is rather limited. This will be understood from the family of speed-torque curves shown in Fig. 5. These curves illustrate actual test results taken with a control system similar to the showing in Fig. 1, but using only the pattern windings 13, 15 and 17 with various points of adjustment used on the potentiometer by the tap 27.

Figure 5:
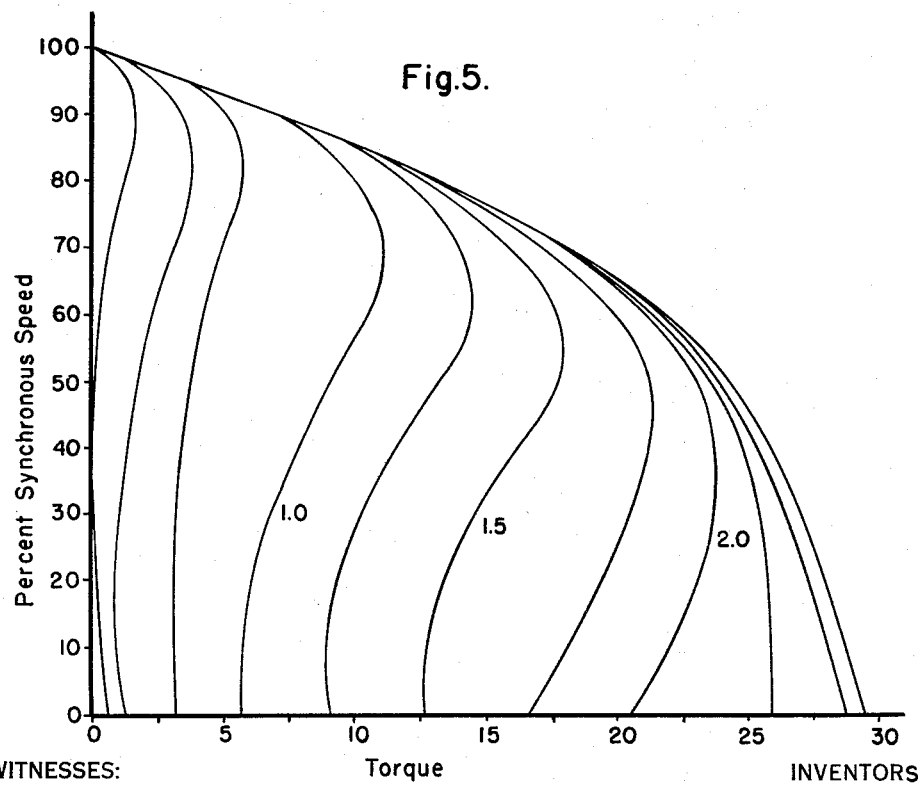

A study of the curves shown in Fig. 5 will reveal that, except for a limited range of high bias currents and hence lowest reactance values of the alternating current main windings 7, 8 and 9, the speed-torque curves have a negative slope and hence are unsuitable for speed control.

The occurrence of the negative slope can be explained as follows: For a given value of impedance adjustment, i. e., for a given value of direct-current bias on the series reactor, an increase in motor torque calls for a corresponding increase in current at a given voltage and speed. The increased current thus flowing through the reactors increases the voltage drop across them, thus decreasing the motor terminal voltage. If the torque is to be maintained at this decreased terminal voltage, the current must be higher for the reduced voltage. This additional increase in current further increases the voltage drop across the reactors and thus decreases the motor terminal voltage. This chain of causes and results continues until the motor pulls out or reaches a low-speed stability. In summary, the drop in terminal voltage due to increasing torque and current can be taken as the cause of the instability occurring in induction motor control systems with adjustable series impedances.

This is in harmony with the fact that if in a reactor control system as just mentioned, the series reactance is controlled for maintenance of constant motor terminal voltage, a family of curves is obtained as indicated in Fig. 6. It will be noted that these curves have positive slopes over the entire length and are thus suitable for speed control. For instance, if the motor thus controlled is to operate at a constant load torque denoted by line F, the speed of the motor is definitely determined by the intersection of the load torque line, for example, F with the one selected speed-torque characteristic. Consequently, in a system according to the showing in Fig. 1, which regulates the series impedance for constant speed, the just mentioned conditions permit the selection of definite speed values simply by adjusting lead 27 on the potentiometer resistor 24 in accordance with one of the available speed-torque characteristics.

For a given speed-torque let the assumption be that there is a decrease in speed. As the motor speed thus decreases, the output voltage of the tachometer generator decreases. Since the ampere turns of the pattern field windings 13, 15 and 17 are in opposition to the windings 14, 16 and 18, as indicated by the arrows adjacent these windings, it is apparent that the saturation of the reactors is increased by such a reduction of the current flow in the windings 14, 16 and 18. The increase in the saturation of the reactors decreases the reactance of the reactors and in consequence the supply voltage is increased to increase the motor speed back to its point of stability. The reverse action takes place when there is an increase in motor speed.

The speed of response depends upon the time constant of the reactor and the magnitude of the ampere-turns in the pattern and speed-sensitive fields. If, for instance, each of these fields had ten times the ampere-turns required for complete saturation of the reactor, then a one-tenth change in tachometer output would either completely saturate or unsaturate the reactor and forcing would be higher.

The anti-hunt windings 19, 20 and 21 are excited together with the control windings 14, 16 and 18 from the tachometer T and hence respond also to the motor speed. The series circuit of the anti-hunt windings includes the adjustable series resistor 34 rated and adjusted in accordance with the desired time constant of the anti-hunt action (a damping effect) and the windings 19, 20 and 21 are poled to oppose the control windings 14, 16 and 18, respectively, but their ampere turns under steady state conditions, are smaller than those of the control windings 14, 16 and 18. Hence, the control is effected mainly by the windings 14, 16 and 18 as explained hereinabove, and the anti-hunt windings have merely a modifying effect and delay the resultant flux build-up, or change, due to changes in motor terminal voltage thus preventing oscillatory effects and thus damp out the effects of transients. In some applications the anti-hunt circuit may not be required.

To summarize, we provide a reactor with three separate and distinct saturating windings, each of which may be capable of more than, fully, or partially, saturating the core of the reactor. The pattern winding establishes the stability point for the circuit. The reactor speed-sensitive winding holds the motor speed at the established stable point. The anti-hunt winding opposes the speed sensitive winding and cuts down the hunting of the machine.

Systems according to the invention and based on the principles hereinabove explained may also be equipped with an amplifier between the control winding, or windings, of the series impedance and the source of the speed responsive voltage. According to the preferred embodiments of the invention involving the provision of saturable reactors in the current supply of the motor, it is preferable to use amplifying means of the electromagnetic type, as shown in the modification of Fig. 2.

According to Fig. 2 the series reactors 100, 110 and 120 have direct-current control windings 140, 160 and 180 connected by a circuit including blocking rectifier R1 to the output circuit of an electrodynamic amplifier A consisting essentially of an amplifying regulating generator RG which operates along the substantially linear and unsaturated portion of its magnetic characteristic. Rectifier R1 prevents a reversal of current in the windings 140, 160 and 180 in case the resultant of the control signals reverses. The voltage generated in the armature 41 of this machine and applied to the reactor control windings 140, 160 and 180 is controlled by four generator field windings 42, 43, 44 and 45. Winding 42 provides most of the self-excitation needed to obtain the desired output voltage. Winding 43 is a self-excited shunt winding which may be poled to oppose the field winding 42 in order to minimize hunting. The self-excitation jointly provided by windings 42 and 43 is tuned, that is, the load circuit resistance, is adjusted to the linear portion of the magnetic machine characteristic so that the remaining field windings 44 and 45 are called upon only to provide a slight control stimulus need to shift the generator output up or down along its characteristic. Winding 44 is excited by a voltage taken from the leads 130 and 131 coupled to the armature winding 129 of the tachometer generator T. Winding 44 is thus excited proportional to motor speed. Winding 45 receives adjusted constant voltage from the control potentiometer 124 which is energized from the positive and negative leads 122 and 123 coupled to a suitable source of direct current supply. Consequently, the output voltage of the amplifying generator RG is proportional to the difference between the constant reference voltage supplied from leads 125 and 127 to the field 45 and the variable control voltage supplied from leads 130 and 131 through the adjusted resistor 132 to the field winding 44.

Otherwise the connection of the motor M from leads L1, L2 and L3 through the main reactor windings 70a, 80a, and 90a, and the energization of field 128 is the same as the showing in Fig. 1 for the corresponding elements. The operation of the scheme shown in Fig. 2 is also apparent from the operation described hereinabove for Fig. 1.

The embodiment of our invention appearing in Fig. 3 also provides a control of the speed of the induction motor. In this instance, however, the speed cue is obtained as a function of slip frequency by a suitable network associated with the motor secondary circuit, rather than by means of a tachometer generator. An additional regulating feature is introduced in this control in the provision of a cue which is a function of motor primary terminal voltage. In this illustration, parts corresponding to those of the embodiment of Fig. 1 bear like reference characters.

The system comprises reactors 10a, 11a and 12a having main windings 7a, 8a and 9a connected in series in supply lines L1, L2 and L3, respectively. For controlling the reactors, two groups of windings are provided. The first group includes windings 13a, 15a and 17a, and the second group includes windings 46a, 47a and 48a. Windings 46a, 47a and 48a are energized by the rectified output of a transformer T2 having its primary connected to motor primary terminals 5 and 6 and having its secondary connected to a rectifier 64 having its output connected to windings 46a, 47a and 48a in series. This affords a control of reactor saturation and, hence, reactance, in dependence of the motor primary terminal voltage. Windings 13a, 15a and 17a are excited by a voltage derived from potentiometers 49 and 50 as determined by the setting of the adjustable taps 51 and 52, respectively. Potentiometer 49 is energized by a voltage across supply phase L2, L3 by means of a transformer T3, the secondary of which is connected across a full-wave rectifier 73 the output of which is connected across the potentiometer 49. Potentiometer 50 is energized by the output of a three-phase rectifier network 62. This network is connected across the three phases of the motor secondary circuit by means of a transformer T1 having a center tapped primary winding 60 connected by three series capacitors 63 across the three phases of the motor secondary circuit and having a center tapped secondary winding 61 connected at three points to the rectifier network 62. The voltage appearing across potentiometer 51 is substantially proportional to the frequency of the secondary circuit current of the motor, that is, the slip frequency of the motor, and therefore changes substantially in inverse relation, or proportion, to the motor speed. The tapped portions of potentiometers 49 and 50 are connected in cumulative relation in a series loop with control windings 13a, 15a and 17a providing excitation in dependence of the sum of the tapped voltage. The excitation of these last-named control windings, therefore, decreases as the motor speed increases. The flux produced in the cores of the reactors by windings 13a, 15a and 17a is in opposition to the flux produced by the other control windings 46a, 47a and 48a in response to the primary terminal voltage. Consequently, during the operation of the motor, the degree of saturation in each reactor is varied in a manner to tend to maintain the primary terminal voltage of the motor at a substantially constant value, as determined by the setting of the tap of potentiometer 49, while the current varies to control the speed.

The performance of this embodiment is essentially of the character depicted by the curves of Fig. 6 and is adequate for many applications. Improved performance is obtainable, however, by the use of shunting capacitors 70, 71 and 72 connected in the secondary circuit of the motor. Fig. 7 shows exemplary characteristics. The speed torque curve Q typifies the performance of the induction motor with relatively low resistance in the rotor circuit. As mentioned in connection with Fig. 5, due to the negative slope of this characteristic, a given voltage does not give a definite speed for a given torque below the pull-out speed (about 40% in the illustrated example). Consequently, speed control by primary voltage regulators is essentially limited to a narrow range of speeds approaching synchronous speed.

Speed stability may be improved by increasing the secondary circuit resistance. Curve R depicts a typical performance characteristic with such increased resistance. With such a speed-torque characteristic, in theory, speed is regulatable, by primary voltage control, down to zero speed. However, for a given load torque, the maximum speed may be too limited. If line F in Fig. 7 represents a given load torque, the maximum attainable speed for the indicated speed-torque characteristic is about 60% of synchronous speed. The curves, therefore, indicate that better speed regulation is obtainable by simultaneously regulating or adjusting the primary voltage and the secondary impedance. Details of one form of such a control may be had by reference to the copending application of Earl C. Rhyne, Herbert R. Behr, and M. L. Priban, Serial No. 250,112, now Patent No. 2,680,829 filed on the same date as this application, entitled "Saturable Reactor Motor Controller."

By introducing a capacitive component in the secondary circuit of the motor, the available range of speed control can be greatly increased without necessitating a change of the secondary circuit connections. The above-mentioned characteristic Q obtained with a comparatively low resistance in the motor's secondary circuit is modified by the capacitive shunt circuits in a manner indicated by dotted characteristic S. This modified characteristic extends the available range of speed control down to near zero speed. The capacitors also improve power factor and increase efficiency at low speeds.

As in any electrical application, the electrical components of the secondary circuit must be properly matched to achieve satisfactory results. In general, for a secondary circuit as shown, the capacitance of each capacitor for three-phase motors of about 1 H. P. or more will range from several microfarads up to several hundred microfarads. In one application in connection with a standard 5 H. P. four-pole motor for use on a 220-volt, three-phase, 60 C. P. S. system, capacitors of 377 microfarads each in combination with resistors of 2.35 ohms each were found to offer optimum results.

In the embodiment of this invention appearing in Fig. 4, the speed cue is again derived from the slip frequency voltage of the secondary circuit of the motor. This circuit is similar in many respects to the circuit of Fig. 3 and, consequently, parts in this figure corresponding to those of Fig. 3 bear like reference characters.

In detail, the D.-C. reference voltage derived from potentiometer 49 is applied across the series-connected windings 13b, 15b and 17b producing a unidirectional flux in the respective reactors 10b, 11b and 12b, having main windings 7b, 8b and 9b. A potentiometer 65 is connected across primary terminal voltage rectifier 64, and its tap 66 is connected to tap 52 of potentiometer 50 having a voltage thereacross proportional to an electrical condition of the secondary winding of the motor. This connection forms part of a series loop including reactor windings 46b, 47b and 48b in which the tapped voltages are cumulatively applied. The flux produced in the respective reactor cores by windings 46b, 47b and 48b is in opposition to the fluxes produced by the windings 13b, 15b and 17b, respectively. A degree of damping is obtained in this embodiment by the use of windings 75b, 76b and 77b which are connected in series with a rheostat 78 across windings 46b, 47b and 48b. The damping windings, respectively, produce fluxes which oppose the fluxes of the windings 46b, 47b and 48b respectively and being connected therewith receive their anti-hunt intelligence simultaneously with the application of an error signal to the last-named control windings. The degree of damping and, hence, system stability is controllable by adjustment of rheostat 78. The performance of this system is analogous in its important aspects with that of Fig. 3. Cumulatively combining the inverse speed and primary motor terminal voltages affords control intelligence in a degree necessary to properly control the motor terminal voltage and current so that speed control of the motor over a wide range by the simple expedient of adjusting the tap 51 of speed control potentiometer 49 is achievable.

Although this discussion in connection with Figs. 3 and 4 has been concerned primarily with the derivation of a speed sense or cue from the secondary circuit voltage of the motor, it will be appreciated that secondary circuit current also includes a component, among others, of slip frequency and may, therefore, be utilized to produce a control cue or signal.

The embodiment and modifications described hereinabove suffice to illustrate our contribution to the art, and illustrate that the invention permits of modifications within the spirit of the invention. Our invention is thus not limited to the exact showings made but embraces such further alterations and modifications as fall within the spirit of our invention.

We claim as our invention:

1. In a control for an alternating-current motor having an alternating-current primary winding circuit, the combination of, saturable reactor means adapted for connection with said primary circuit to control the alternating-current terminal voltage of the motor, said reactor means having control winding means, circuit connections including adjustable impedance means for applying a control voltage to said control winding means, a tachometer generator adapted for connection to said motor to be driven thereby and having an output voltage proportional to motor speed, circuit means for applying the speed proportional voltage of said tachometer generator to said control winding means in a sense opposite to that of said control voltage, and circuit means responsive at least in part to said speed proportional voltage of said tachometer generator for applying a voltage to said control winding means in a sense opposite to that of said speed proportional voltage.

2. In a control for an alternating-current motor having an alternating-current primary winding circuit, the combination of, electrical control means adapted for connection with said primary circuit to control the alternating-current terminal voltage of the motor, an adjustable voltage producing device for producing a reference voltage, a tachometer generator adapted for connection to said motor to be driven thereby to produce a speed proportional voltage, circuit means connected with said adjustable voltage producing means and with said electrical control means for controlling said electrical control means, circuit means connected with said tachometer generator and connected with said electrical control means for controlling said electrical control means in a sense opposite to said first named circuit means, and circuit means responsive at least in part to the speed proportional voltage of said tachometer generator for controlling said electrical control means in a sense opposite to said second named circuit means.

3. In a control for an alternating-current induction motor having an alternating-current primary winding circuit, the combination of electrical control means adapted for connection with the primary winding circuit of said motor for controlling the motor terminal voltage, a plurality of windings for controlling said electrical control means, an adjustable electrical device for producing a reference voltage, a tachometer generator for connection to said motor to be driven thereby to produce a speed proportional voltage, circuit means connecting said electrical device to one of said windings, circuit means connecting said tachometer generator to a second of said windings, said one winding and said second winding being poled in opposite senses, and circuit means responsive at least in part to said speed proportional voltage and connected to a third of said windings, said third winding being poled in a sense opposite to said second winding.

4. In a control for an alternating-current induction motor having an alternating current primary winding circuit, the combination of, variable impedance means for connection in said primary circuit for controlling motor terminal voltage, control winding means for said variable impedance means, a generator having an output circuit including a series field winding connected to said control winding means, a shunt field winding on said generator differentially related to said series field winding, the resistance of said output circuit being adjusted so that the slope of the resistance characteristic corresponds to the slope of the substantially linear portion of the magnetic machine characteristic, a pair of differentially related control field windings on said generator, an adjustable reference voltage producing device connected to one of said pair of field windings, and a rate generator for connection to said motor to be driven thereby having an output circuit connected to the other of said pair of field windings.

5. In a control for a three phase alternating-current induction motor having a three phase primary winding circuit, the combination of, three saturable reactors each having a main winding and a control winding, the respective main windings being adapted for connection to the respective motor terminals, a generator having an output circuit including a series field winding connected in a series circuit with each control winding of the saturable reactors, a shunt field winding on said generator differentially related to said series field winding, the resistance of said output circuit being adjusted so that the slope of the resistance characteristic corresponds to the slope of the substantially linear portion of the magnetic machine characteristic, a pair of differentially related control field windings on said generator, an adjustable reference voltage producing device connected to one of said pair of field windings, and a rate generator for connection to said motor to be driven thereby having an output circuit connected to the other of said pair of field windings.

6. In a control system for an alternating-current electric motor, in combination, an alternating-current motor having a primary winding and a relatively high resistance secondary winding, an alternating-current supply circuit connected to the primary winding, saturable reactance means having an alternating-current main winding series connected in said supply circuit, said reactance means including a plurality of reactor-saturating control windings for controlling the reactance of said main winding, a direct-current source of adjustable constant voltage, circuit means connecting one reactor-saturating winding to said direct-current source, a tachometer generator coupled to the motor and thus having an output voltage that is proportional to motor speed, circuit means connecting a second reactor-saturating winding to the output of the tachometer generator, said second reactor-saturating winding being poled in opposition to said one reactor-saturating winding, circuit means connecting a third reactor-saturating winding to the output of said tachometer generator to be responsive at least in part to the output of said tachometer generator, said third reactor-saturating winding being poled in opposition to said second reactor-saturating winding, said third reactor-saturating winding having a lower inductive time constant and for normal voltages of the tachometer generator fewer ampere turns than said one reactor-saturating winding.

7. In a system of control for an alternating-current induction motor, in combination, an induction motor having a primary winding and a secondary winding, alternating-current supply circuit means, a saturable reactance means having a main winding series connected with the primary winding and the supply circuit, and having a plurality of direct-current reactor-saturating control windings, a direct-current source of adjustable constant voltage, circuit means connecting said direct-current source to a first reactor-saturating winding, a tachometer generator coupled to be driven by the induction motor and producing a voltage proportional to the speed of said induction motor, circuit means connecting said tachometer generator to a second reactor-saturating winding, said first and said second reactor-saturating windings being wound on said saturable reactance means to produce opposite magnetic effects, a third reactor-saturating winding having a somewhat faster response than the second reactor-saturating winding and wound to produce an opposite magnetic effect to the second reactor-saturating winding, and circuit means connecting said third reactor-saturating winding to said tachometer generator to be energized at least in part by the output of said tachometer generator.

8. In a system of control for an alternating-current induction motor, in combination, an induction motor having a primary winding and a secondary winding, said secondary winding including adjustable impedances, alternating-current supply circuit means, a saturable reactance means having a main winding series connected with the primary winding and the supply circuit and having a plurality of direct-current reactor-saturating control windings, a direct-current source of adjustable constant voltage, circuit means connecting said direct-current source to a first reactor-saturating winding, a tachometer generator coupled to be driven by the induction motor to thus produce a voltage substantially proportional to induction motor speed, circuit means connecting said tachometer generator to a second reactor-saturating winding, said first and said second reactor-saturating windings being wound on said saturable reactance means to produce opposing magnetic effects, a third reactor-saturating winding having a different time response than the second reactor-saturating winding and wound to produce an opposing magnetic effect to the magnetic effect produced by the second reactor-saturating winding, circuit means connecting said third reactor-saturating winding to said tachometer generator to be responsive at least in part to the output of said tachometer generator, said adjustable secondary impedance and the saturable reactance means changing the speed-torque characteristic of said induction motor.

References Cited in the file of this patent

UNITED STATES PATENTS

| | | |
|---|---|---|
| 1,448,902 | Schaffer | Mar. 20, 1923 |
| 2,229,911 | Logan | Oct. 27, 1942 |
| 2,440,319 | Wickerham | Apr. 27, 1948 |
| 2,462,751 | Kochler | Feb. 22, 1949 |
| 2,484,006 | Ankenman et al. | Oct. 11, 1949 |
| 2,560,698 | Koehler | July 17, 1951 |
| 2,565,157 | Wickerham et al. | Aug. 21, 1951 |
| 2,568,701 | Arnold | Sept. 25, 1951 |
| 2,683,846 | Carnegie et al. | July 13, 1954 |